(12) United States Patent
Sun et al.

(10) Patent No.: US 10,001,762 B2
(45) Date of Patent: Jun. 19, 2018

(54) VOLTAGE CONTROL METHOD AND APPARATUS OF CENTRAL BUS IN POWER SYSTEM

(71) Applicant: Tsinghua University, Beijing (CN)

(72) Inventors: Hongbin Sun, Beijing (CN); Qinglai Guo, Beijing (CN); Bin Wang, Beijing (CN); Boming Zhang, Beijing (CN); Xuran Wang, Beijing (CN); Huaichang Ge, Beijing (CN); Wenchuan Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 664 days.

(21) Appl. No.: 14/601,390

(22) Filed: Jan. 21, 2015

(65) Prior Publication Data

US 2015/0207324 A1 Jul. 23, 2015

(30) Foreign Application Priority Data

Jan. 22, 2014 (CN) .......................... 2014 1 0030530

(51) Int. Cl.
*G05B 15/02* (2006.01)
*H02J 3/16* (2006.01)

(52) U.S. Cl.
CPC ............. *G05B 15/02* (2013.01); *H02J 3/16* (2013.01); *Y02E 40/34* (2013.01)

(58) Field of Classification Search
None
See application file for complete search history.

(56) References Cited

U.S. PATENT DOCUMENTS

| 2008/0225602 | A1* | 9/2008 | Matsubara | G11C 16/3468 365/185.29 |
| 2010/0277002 | A1* | 11/2010 | Folts | H02J 3/383 307/82 |
| 2012/0068618 | A1* | 3/2012 | Koski | H05B 33/0851 315/240 |
| 2012/0217935 | A1* | 8/2012 | Hawawini | H02J 7/04 320/162 |
| 2015/0061750 | A1* | 3/2015 | Kandah | H03K 17/0822 327/419 |

* cited by examiner

*Primary Examiner* — Tuan Dao
(74) *Attorney, Agent, or Firm* — Kile Park Reed & Houtteman PLLC

(57) ABSTRACT

A voltage control method and apparatus of a central bus in a power system are provided. The method comprises: S1: obtaining a predetermined voltage and a current voltage; S2: obtaining a first voltage adjustment of the generator and a second voltage adjustment of the dynamic reactive power compensation device; S3: sending the first voltage adjustment and the second voltage adjustment; S4: judging whether a current reactive power of the dynamic reactive power compensation device is between a first predetermined reactive power and a second predetermined reactive power; S5: if yes, obtaining a third voltage adjustment of the generator and a fourth voltage adjustment of the dynamic reactive power compensation device; S6: sending the third voltage adjustment and the fourth voltage adjustment; repeating steps S1-S7 after a predetermined period of time; S7: if no, repeating steps S1-S7 after the predetermined period of time.

12 Claims, 2 Drawing Sheets

VOLTAGE CONTROL METHOD AND APPARATUS OF CENTRAL BUS IN POWER SYSTEM

CROSS-REFERENCE TO RELATED APPLICATION

This application claims priority to and benefits of Chinese Patent Application Serial No. 201410030530.0, filed with the State Intellectual Property Office of P. R. China on Jan. 22, 2014, the entire content of which is incorporated herein by reference.

FIELD

The present disclosure relates to a power system evaluation and control field, and more particularly relates to a voltage control method and apparatus of a central bus in a power system.

BACKGROUND

In recent years, problems of voltage stability of a power system frequently occur and some of them have caused enormous influence, so a voltage control method is particularly important. However, a conventional voltage control method is limited, such that the controlling response speed is slow.

SUMMARY

Embodiments of the present disclosure seek to solve at least one of the problems existing in the related art to at least some extent.

A first objective of the present disclosure is aimed to provide a voltage control method of a central bus in a power system. With the method, a dynamic reactive power compensation device is used as a control means, participating in a voltage control of the central bus in the power system, and a preventive control may be implemented by a dynamic reactive power optimization when the power system is out of order.

The voltage control method of a central bus in a power system provided in the present disclosure comprises: S1: obtaining a predetermined voltage and a current voltage of the central bus; S2: obtaining a first voltage adjustment of a generator participating in a voltage control and a second voltage adjustment of a dynamic reactive power compensation device participating in the voltage control according to the predetermined voltage and the current voltage; S3: sending the first voltage adjustment to the generator participating in the voltage control and the second voltage adjustment to the dynamic reactive power compensation device participating in the voltage control to perform a voltage control; S4: judging whether a current reactive power of the dynamic reactive power compensation device is between a first predetermined reactive power and a second predetermined reactive power; S5: if the current reactive power of the dynamic reactive power compensation device is between the first predetermined reactive power and the second predetermined reactive power, obtaining a third voltage adjustment of a generator participating in an optimization control and a fourth voltage adjustment of a dynamic reactive power compensation device participating in the optimization control; S6: sending the third voltage adjustment to the generator participating in the optimization control and the fourth voltage adjustment to the dynamic reactive power compensation device participating in the optimization control to perform a dynamic reactive power optimization, and repeating steps S1-S7 after a predetermined period of time; S7: if the current reactive power of the dynamic reactive power compensation device is not between the first predetermined reactive power and the second predetermined reactive power, repeating steps S1-S7 after the predetermined period of time.

In some embodiments, obtaining the first voltage adjustment and the second voltage adjustment according to formula (1):

$$\min_{\Delta V_g, \Delta V_s} \{W_p \| a \cdot (V_p - V_p^{ref}) + C_{pg}\Delta V_g + C_{ps}\Delta V_s \|^2 + \tag{1}$$

$$W_q(\|\Theta_g\|^2 + \|\Theta_s\|^2)\}$$

$$\text{s.t.} \quad V_p^{min} \le V_p + C_{pg}\Delta V_g + C_{ps}\Delta V_s \le V_p^{max}$$

$$Q_g^{min} \le Q_g + C_g\Delta V_g + C_{gs}\Delta V_s \le Q_g^{max}$$

$$Q_s^{min} \le Q_s + C_{sg}\Delta V_g + C_s\Delta V_s \le Q_s^{max}$$

$$|\Delta V_g| \le \Delta V_g^{max}$$

$$|\Delta V_s| \le \Delta V_s^{max},$$

where p represents the central bus, g represents the generator, s represents the dynamic reactive power compensation device, $\Delta V_g$ is a first voltage adjustment vector, $\Delta V_s$ is a second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses, $W_q$ is a second weight coefficient vector of reserve margins of the reactive powers of the generators and the dynamic reactive power compensation devices, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

In some embodiments, a $i^{th}$ component in $\Theta_g$ is calculated according to formula (2):

$$\Theta_{g_i} = \frac{Q_{g_i} + \sum_{j=1}^{Ng} C_{g_{ij}} \Delta V_{g_j} + \sum_{k=1}^{Ns} C_{gs_{ik}} \Delta V_{s_k} - Q_{g_i}^{min}}{Q_{g_i}^{max} - Q_{g_i}^{min}}, \quad (2)$$

and a $i^{th}$ component in $\Theta_s$ is calculated according to formula (3):

$$\Theta_{s_i} = \frac{Q_{s_i} + \sum_{j=1}^{Ns} C_{s_{ij}} \Delta V_{s_j} + \sum_{k=1}^{Ng} C_{sg_{ik}} \Delta V_{g_k} - Q_{s_i}^{min}}{Q_{s_i}^{max} - Q_{s_i}^{min}}, \quad (3)$$

where $\Theta_{g_i}$ is the $i^{th}$ component in $\Theta_g$, $\Theta_{s_i}$ is the $i^{th}$ component in $\Theta_s$, $N_s$ is a number of the dynamic reactive power compensation devices participating in the voltage control, $N_g$ is a number of the generators participating in the voltage control, $Q_{g_i}$ a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $\Delta V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_{g_i}^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

In some embodiments, the first predetermined reactive power is $Q_s^{pre} - 0.1 * Q_s^{max}$, the second predetermined reactive power is $Q_s^{pre} + 0.1 * Q_s^{max}$, where $Q_s^{pre} = (Q_s^{max} + Q_s^{min})/2$.

In some embodiments, obtaining the third voltage adjustment and the fourth voltage adjustment according to formula (4):

$$\min_{\Delta V_g', \Delta V_s'} \{W_s \|\mu_s\|^2 + W_g \|\mu_g\|^2\} \quad (4)$$

s.t. $V_p - V_{band} \leq V_p + C_{pg} \Delta V_g' + C_{ps} \Delta V_s' \leq V_p + V_{band}$ $Q_g^{min} \leq Q_g + C_g \Delta V_g' + C_{gs} \Delta V_s' \leq Q_g^{max}$ $Q_s^{min} \leq Q_s + C_{sg} \Delta V_g' + C_s \Delta V_s' \leq Q_s^{max}$ -continued $|\Delta V_g'| \leq \Delta V_g^{max}$ $|\Delta V_s'| \leq \Delta V_s^{max}$, where $\Delta V_g'$ is a third voltage adjustment vector, $\Delta V_s'$ is a fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control, $W_g$ is a weight coefficient vector of the reactive powers of the generators participating in the optimization control, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{min}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g'$ is a maximum adjustment vector allowed by the generators participating in the optimization control, $\Delta V_s^{max}$ is a maximum adjustment vector allowed by the dynamic reactive power compensation devices participating in the optimization control.

In some embodiments, a $i^{th}$ component in $\mu_s$ is calculated according to formula (5):

$$\mu_{si} = \frac{Q_{si} + \sum_{j=1}^{Ns} C_{s_{ij}} \Delta V_{s_j}' + \sum_{k=1}^{Ng} C_{sg_{ik}} \Delta V_{g_k}' - Q_{s_i}^{reference}}{Q_{si}^{max} - Q_{si}^{min}}, \quad (5)$$

and a $i^{th}$ component in $\mu_g$ is calculated according to formula (6):

$$\mu_{gi} = \frac{Q_{gi} + \sum_{j=1}^{Ng} C_{g_{ij}} \Delta V_{g_j}' + \sum_{k=1}^{Ns} C_{gs_{ik}} \Delta V_{s_k}' - Q_g^{aver}}{Q_g^{sum}}, \quad (6)$$

where $\mu_{si}$ is the $i^{th}$ component in $\mu_s$, $\mu_{gi}$ is the $i^{th}$ component in $\mu_g$, $N_S$ is a number of the dynamic reactive power compensation devices participating in the optimization control, $N_g$ is a number of the generators participating in the optimization control, $Q_{s_i}$ is a $i^{th}$ component in $Q_s$, $C_{s_{ij}}$ is an element corresponding to a $i^{th}$ generator participating in the optimization control of a $i^{th}$ component in $C_s$, $\Delta V_{s_j}{}'$ is a $j^{th}$ component corresponding to the $j^{th}$ generator participating in the optimization control in $\Delta V_s{}'$, $C_{sg_{ik}}$ is an element corresponding to a $k^{th}$ dynamic reactive power compensation device participating in the optimization control of a $i^{th}$ component in $C_{sg}$, $\Delta V_{g_k}{}'$ is a $k^{th}$ component corresponding to the $k^{th}$ dynamic reactive power compensation device participating in the optimization control in $\Delta V_g{}'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ is a $i^{th}$ component in $Q_s^{max}$, $Q_{g_i}$ is a $i^{th}$ component in $Q_g$, $C_{g_{ij}}$ is an element corresponding to the $j^{th}$ generator participating in the optimization control of a $i^{th}$ component in $C_g$, $\Delta V_{g_j}{}'$ is a $j^{th}$ component corresponding to the $j^{th}$ generator participating in the optimization control in $\Delta V_g{}'$, $C_{gs_{ik}}$ is an element corresponding to the $k^{th}$ dynamic reactive power compensation device participating in the optimization control of a $i^{th}$ component in $C_{gs}$, $\Delta V_{s_k}{}'$ is a $k^{th}$ component corresponding to the $k^{th}$ dynamic reactive power compensation device participating in the optimization control in $\Delta V_s{}'$, $Q_g^{aver}$ is an average value of reactive power of the generator participating in the optimization control, $Q_g^{sum}$ is a sum of reactive power of the generator participating in the optimization control.

A second objective of the present disclosure is aimed to provide a voltage control apparatus of a central bus in a power system.

The voltage control apparatus of a central bus in a power system provided in the present disclosure comprises: a first obtaining module, configured to obtain a predetermined voltage and a current voltage of the central bus; a second obtaining module, configured to obtain a first voltage adjustment of a generator participating in a voltage control and a second voltage adjustment of a dynamic reactive power compensation device participating in the voltage control according to the predetermined voltage and the current voltage; a first sending module, configured to send the first voltage adjustment to the generator participating in the voltage control and the second voltage adjustment to the dynamic reactive power compensation device participating in the voltage control to perform a voltage control; a judging module, configured to judge whether a current reactive power of the dynamic reactive power compensation device is between a first predetermined reactive power and a second predetermined reactive power; a third obtaining module, configured to obtain a third voltage adjustment of a generator participating in an optimization control and a fourth voltage adjustment of a dynamic reactive power compensation device participating in the optimization control if the current reactive power of the dynamic reactive power compensation device is between the first predetermined reactive power and the second predetermined reactive power; a second sending module, configured to send the third voltage adjustment to the generator participating in the optimization control and the fourth voltage adjustment to the dynamic reactive power compensation device participating in the optimization control to perform a dynamic reactive power optimization.

In some embodiments, the second obtaining module is further configured to obtain the first voltage adjustment and the second voltage adjustment according to formula (1):

$$\min_{\Delta V_g, \Delta V_s} \{ W_p \| a \cdot (V_p - V_p^{ref}) + C_{pg} \Delta V_g + C_{ps} \Delta V_s \|^2 + W_q (\|\Theta_g\|^2 + \|\Theta_s\|^2) \} \quad (1)$$

$$\text{s.t.} \quad V_p^{min} \leq V_p + C_{pg} \Delta V_g + C_{ps} \Delta V_s \leq V_p^{max}$$
$$Q_g^{min} \leq Q_g + C_g \Delta V_g + C_{gs} \Delta V_s \leq Q_g^{max}$$
$$Q_s^{min} \leq Q_s + C_{sg} \Delta V_g + C_s \Delta V_s \leq Q_s^{max}$$
$$|\Delta V_g| \leq \Delta V_g^{max}$$
$$|\Delta V_s| \leq \Delta V_s^{max},$$

where p represents the central bus, g represents the generator, s represents the dynamic reactive power compensation device, $\Delta V_g$ is a first voltage adjustment vector, $\Delta V_s$ is a second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses, $W_q$ is a second weight coefficient vector of reserve margins of the reactive powers of the generators and the dynamic reactive power compensation devices, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

In some embodiments, a $i^{th}$ component in $\Theta_g$ is calculated according to formula (2):

$$\Theta_{g_i} = \frac{Q_{g_i} + \sum_{j=1}^{Ng} C_{g_{ij}} \Delta V_{g_j} + \sum_{k=1}^{Ns} C_{gs_{ik}} \Delta V_{s_k} - Q_{g_i}^{min}}{Q_{g_i}^{max} - Q_{g_i}^{min}}, \quad (2)$$

and a $i^{th}$ component in $\Theta_s$ is calculated according to formula (3):

$$\Theta_{s_i} = \frac{Q_{s_i} + \sum_{j=1}^{Ns} C_{s_{ij}} \Delta V_{s_j} + \sum_{k=1}^{Ng} C_{sg_{ik}} \Delta V_{g_k} - Q_{s_i}^{min}}{Q_{s_i}^{max} - Q_{s_i}^{min}}, \quad (3)$$

where $\Theta_g$ is the $i^{th}$ component in $\Theta_g$, $\Theta_{s_i}$ is the $i^{th}$ component in $\Theta_s$, $N_S$ is a number of the dynamic reactive power compensation devices participating in the voltage control, $N_g$ is a number of the generators participating in the voltage control, $Q_{g_i}$ is a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $\Delta V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_{g_i}^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

In some embodiments, the first predetermined reactive power is $Q_s^{pre} - 0.1 * Q_s^{max}$, the second predetermined reactive power is $Q_s^{pre} + 0.1 * Q_s^{max}$, where $Q_s^{pre} = (Q_s^{max} + Q_s^{min})/2$.

In some embodiments, the third obtaining module is further configured to obtain the third voltage adjustment and the fourth voltage adjustment according to formula (4):

$$\min_{\Delta V_g', \Delta V_s'} \{W_s \|\mu_s\|^2 + W_g \|\mu_g\|^2\} \quad (4)$$

s.t. $V_p - V_{band} \leq V_p + C_{pg} \Delta V_g' + C_{ps} \Delta V_s' \leq V_p + V_{band}$ $Q_g^{min} \leq Q_g + C_g \Delta V_g' + C_{gs} \Delta V_s' \leq Q_g^{max}$ $Q_s^{min} \leq Q_s + C_{sg} \Delta V_g' + C_s \Delta V_s' \leq Q_s^{max}$ $|\Delta V_g'| \leq \Delta V_g^{max}$ $|\Delta V_s'| \leq \Delta V_s^{max}$, where $\Delta V_g'$ is a third voltage adjustment vector, $\Delta V_s'$ is a fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control, $W_g$ is a weight coefficient vector of the reactive powers of the generators participating in the optimization control, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{min}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g^{max}$ is a maximum adjustment vector allowed by the generators participating in the optimization control, $\Delta V_s^{max}$ is a maximum adjustment vector allowed by the dynamic reactive power compensation devices participating in the optimization control.

In some embodiments, a $i^{th}$ component in $\mu_s$ is calculated according to formula (5):

$$\mu_{si} = \frac{Q_{si} + \sum_{j=1}^{Ns} C_{s_{ij}} \Delta V_{s_j}' + \sum_{k=1}^{Ng} C_{sg_{ik}} \Delta V_{g_k}' - Q_{s_i}^{reference}}{Q_{si}^{max} - Q_{si}^{min}}, \quad (5)$$

and a $i^{th}$ component in $\mu_g$ is calculated according to formula (6):

$$\mu_{gi} = \frac{Q_{gi} + \sum_{j=1}^{Ng} C_{g_{ij}} \Delta V_{g_j}' + \sum_{k=1}^{Ns} C_{gs_{ik}} \Delta V_{s_k}' - Q_g^{aver}}{Q_g^{sum}}, \quad (6)$$

where $\mu_{si}$ is the $i^{th}$ component in $\mu_s$, $\mu_{gi}$ is the $i^{th}$ component in $\mu_g$, $N_S$ is a number of the dynamic reactive power compensation devices participating in the optimization control, $N_g$ is a number of the generators participating in the optimization control, $Q_{s_i}$ is a $i^{th}$ component in $Q_s$, $C_{s_{ij}}$ is an element corresponding to a $j^{th}$ generator participating in the optimization control of a $i^{th}$ component in $C_s$, $\Delta V_{s_j}'$ is a $j^{th}$ component corresponding to the $j^{th}$ generator participating in the optimization control in $\Delta V_s'$, $C_{sg_{ik}}$ is an element corresponding to a $k^{th}$ dynamic reactive power compensation device participating in the optimization control of a $i^{th}$ component in $C_{sg}$, $\Delta V_{g_k}{}'$ is a $k^{th}$ component corresponding to the $k^{th}$ dynamic reactive power compensation device participating in the optimization control in $\Delta V_g{}'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ is a $i^{th}$ component in $Q_s^{max}$, $Q_{g_j}$ is a $i^{th}$ component in $Q_g$, $C_{g_{ij}}$ is an element corresponding to the $j^{th}$ generator participating in the optimization control of a $i^{th}$ component in $C_g$, $\Delta V_{g_j}{}'$ is a $j^{th}$ component corresponding to the $j^{th}$ generator participating in the optimization control in $\Delta V_g{}'$, $C_{gs_{ik}}$ is an element corresponding to the $k^{th}$ dynamic reactive power compensation device participating in the optimization control of a $i^{th}$ component in $C_{gs}$, $\Delta V_{s_k}{}'$ is a $k^{th}$ component corresponding to the $k^{th}$ dynamic reactive power compensation device participating in the optimization control in $\Delta V_s{}'$, $Q_g^{aver}$ is an average value of reactive power of the generator participating in the optimization control, $Q_g^{sum}$ is a sum of reactive power of the generator participating in the optimization control.

With the voltage control method and apparatus of a central bus in a power system provided by the present disclosure, a dynamic reactive power compensation device is used in a conventional voltage control model and a characteristic of fast adjustment of the dynamic reactive power compensation device is fully utilized, in addition, a dynamic reactive power optimization model is established and a reserve level of a reactive power in the power system may be improved by replacing the reactive power of the dynamic reactive power compensation device with the slow dynamic reactive power compensation device, further, an effective preventive control for transient voltage stability may be implemented by the method and a recovery effect after disturbances of voltages of the power system can be improved.

A third objective of the present disclosure is aimed to provide computer readable storage medium, comprising a computer program for executing the voltage control method of a central bus in a power system according to the first objective of the present disclosure.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
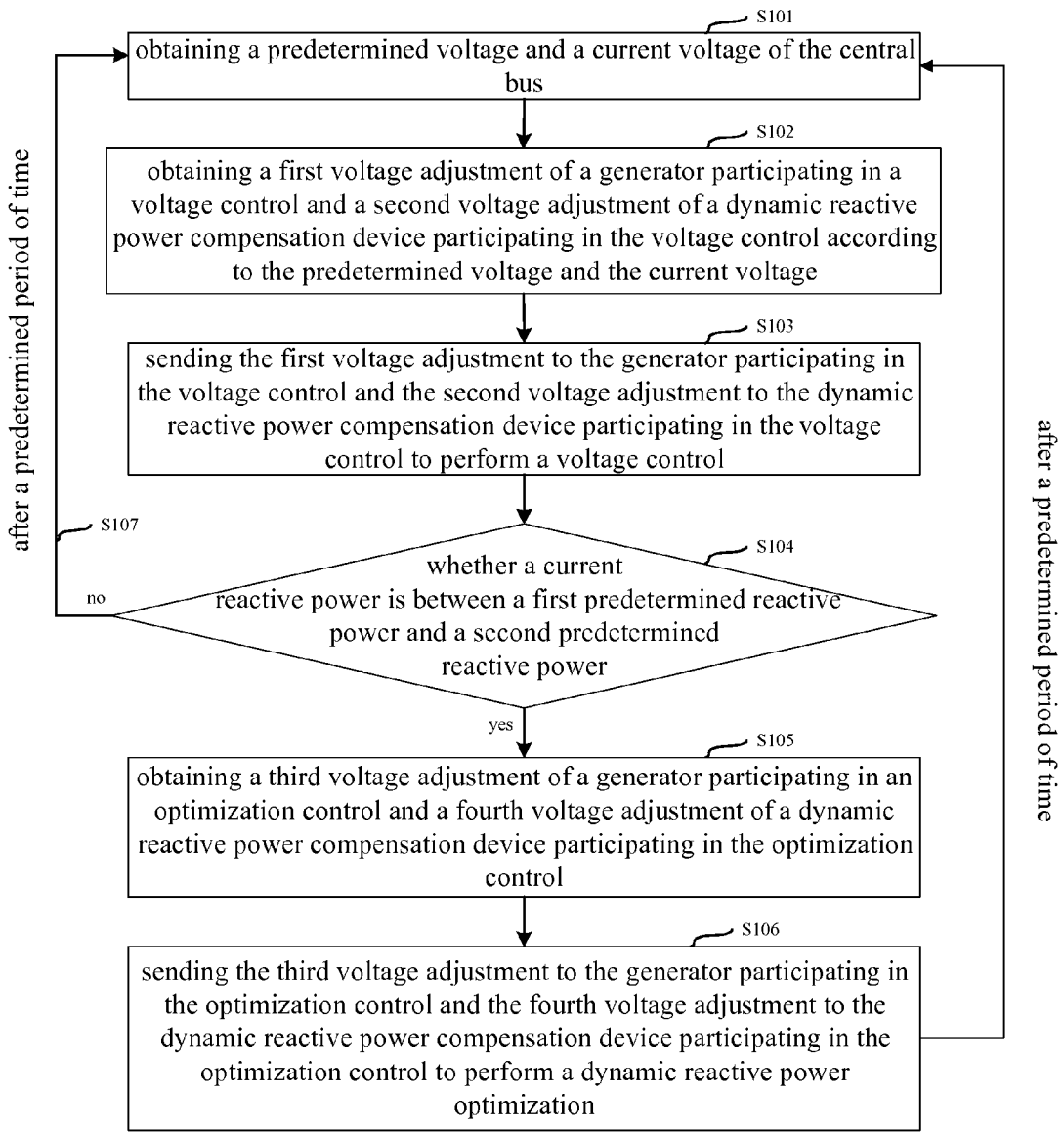
FIG. 1 is a flow chart of the voltage control method of a central bus in a power system according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance.

In the description, unless specified or limited otherwise, it is to be understood that phraseology and terminology used herein with reference to device or element orientation (for example, terms like "upper", "lower", and the like) should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the following, the voltage control method and apparatus of a central bus in a power system according to embodiments of the present disclosure will be described in detail with reference to drawings.

As shown in FIG. 1, the voltage control method of a central bus in a power system provided by the present disclosure includes the following steps.

At step S101: a predetermined voltage and a current voltage of the central bus are obtained. Specifically, the predetermined voltage and the current voltage of the central bus can be obtained from a dispatching center of the power system. More specifically, at a current acquisition time, the predetermined voltage and the current voltage of the central bus corresponding to the current acquisition time can be obtained from the dispatching center of the power system.

At step S102: a first voltage adjustment of a generator participating in a voltage control and a second voltage adjustment of a dynamic reactive power compensation device participating in the voltage control are obtained according to the predetermined voltage and the current voltage.

In an embodiment, the first voltage adjustment and the second voltage adjustment may be obtained according to formula (1):

$$\min_{\Delta V_g, \Delta V_s} \{W_p \| a \cdot (V_p - V_p^{ref}) + C_{pg}\Delta V_g + C_{ps}\Delta V_s \|^2 + \quad (1)$$
$$W_q(\|\Theta_g\|^2 + \|\Theta_s\|^2)\}$$
$$\text{s.t.} \quad V_p^{min} \le V_p + C_{pg}\Delta V_g + C_{ps}\Delta V_s \le V_p^{max}$$
$$Q_g^{min} \le Q_g + C_g\Delta V_g + C_{gs}\Delta V_s \le Q_g^{max}$$
$$Q_s^{min} \le Q_s + C_{sg}\Delta V_g + C_s\Delta V_s \le Q_s^{max}$$
$$|\Delta V_g| \le \Delta V_g^{max}$$
$$|\Delta V_s| \le \Delta V_s^{max},$$

where p represents the central bus, g represents the generator, s represents the dynamic reactive power compensation device, $\Delta V_g$ is a first voltage adjustment vector, $\Delta V_s$ is a second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses and a range of $\alpha$ is 1-10, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses and a range of $W_p$ is 0.1-1, $W_q$ is a second weight coefficient vector of reserve margins of the reactive powers of the generators and the dynamic reactive power compensation devices and a range of $W_q$ is 10-100, the reserve margin is the percentage of counts of the current reactive powers on the largest providable reactive powers, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

In an embodiment, all parameters in formula (1) can be obtained from the dispatching center of the power system.

In an embodiment, a $i^{th}$ component in $\Theta_g$ may be calculated according to formula (2):

$$\Theta_{g_i} = \frac{Q_{g_i} + \sum_{j=1}^{Ng} C_{g_{ij}}\Delta V_{g_j} + \sum_{k=1}^{Ns} C_{gs_{ik}}\Delta V_{s_k} - Q_{g_i}^{min}}{Q_{g_i}^{max} - Q_{g_i}^{min}}, \quad (2)$$

and a $i^{th}$ component in $\Theta_s$ may be calculated according to formula (3):

$$\Theta_{s_i} = \frac{Q_{s_i} + \sum_{j=1}^{Ns} C_{s_{ij}}\Delta V_{s_j} + \sum_{k=1}^{Ng} C_{sg_{ik}}\Delta V_{g_k} - Q_{s_i}^{min}}{Q_{s_i}^{max} - Q_{s_i}^{min}}, \quad (3)$$

where $\Theta_{g_i}$ is the $i^{th}$ component in $\Theta_g$, $\Theta_{s_i}$ is the $i^{th}$ component in $\Theta_s$, $N_s$ is a number of the dynamic reactive power compensation devices participating in the voltage control, $N_g$ is a number of the generators participating in the voltage control, $Q_{g_i}$ is a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $\Delta V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_{g_i}^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

At step S103: the first voltage adjustment is sent to the generator participating in the voltage control and the second voltage adjustment is sent to the dynamic reactive power compensation device participating in the voltage control to perform a voltage control.

Specifically, the first voltage adjustment and the second voltage adjustment can be as control instructions and sent to the corresponding generator and the dynamic reactive power compensation device, each generator and each dynamic reactive power compensation device perform the voltage control according to the corresponding control instruction at a voltage control phase of the central bus.

At step S104: it is judged whether a current reactive power of the dynamic reactive power compensation device is between a first predetermined reactive power and a second predetermined reactive power.

In an embodiment, the first predetermined reactive power is $Q_s^{pre} - 0.1 * Q_s^{max}$, the second predetermined reactive power is $Q_s^{pre} + 0.1 * Q_s^{max}$, where $Q_s^{pre} = (Q_s^{max} + Q_s^{min})/2$.

At step S105: if the current reactive power of the dynamic reactive power compensation device is between the first predetermined reactive power and the second predetermined reactive power, a third voltage adjustment of a generator participating in an optimization control and a fourth voltage adjustment of a dynamic reactive power compensation device participating in the optimization control are obtained.

At step S106, the third voltage adjustment is sent to the generator participating in the optimization control and the fourth voltage adjustment is sent to the dynamic reactive power compensation device participating in the optimization control to perform a dynamic reactive power optimization and steps S101-S107 are repeated after a predetermined period of time.

Specifically, the third voltage adjustment and the fourth voltage adjustment can be as control instructions and sent to the corresponding generator and the dynamic reactive power compensation device, each generator and each dynamic reactive power compensation device perform the voltage control according to the corresponding control instruction at a reactive power margin optimization phase of the central bus.

In an embodiment, the predetermined period of time may be five to ten minutes.

In an embodiment, the third voltage adjustment and the fourth voltage adjustment may be obtained according to formula (4):

$$\min_{\Delta V'_g, \Delta V'_s} \{W_s \|\mu_s\|^2 + W_g \|\mu_g\|^2\} \quad (4)$$

$$\text{s.t.} \quad V_p - V_{band} \leq V_p + C_{pg} \Delta V'_g + C_{ps} \Delta V'_s \leq V_p + V_{band}$$

$$Q_g^{min} \leq Q_g + C_g \Delta V'_g + C_{gs} \Delta V'_s \leq Q_g^{max}$$

$$Q_s^{min} \leq Q_s + C_{sg} \Delta V'_g + C_s \Delta V'_s \leq Q_s^{max}$$

$$|\Delta V'_g| \leq \Delta V_g^{max}$$

$$|\Delta V'_s| \leq \Delta V_s^{max},$$

where $\Delta V_g'$ is a third voltage adjustment vector, $\Delta V_s'$ is a fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control and a range of $W_s$ is 0.1-1, $W_g$ is a weight coefficient vector of the reactive powers of the generators participating in the optimization control and a range of $W_g$ is 10-100, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{min}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g^{max}$ is a maximum adjustment vector allowed by the generators participating in the optimization control, $\Delta V_s^{max}$ is a maximum adjustment vector allowed by the dynamic reactive power compensation devices participating in the optimization control.

In an embodiment, a $i^{th}$ component in $\mu_s$ may be calculated according to formula (5):

$$\mu_{si} = \frac{Q_{si} + \sum_{j=1}^{Ns} C_{s_{ij}} \Delta V'_{s_j} + \sum_{k=1}^{Ng} C_{sg_{ik}} \Delta V'_{g_k} - Q_{s_i}^{reference}}{Q_{si}^{max} - Q_{si}^{min}}, \quad (5)$$

and a $i^{th}$ component in $\mu_g$ may be calculated according to formula (6):

$$\mu_{gi} = \frac{Q_{gi} + \sum_{j=1}^{Ng} C_{g_{ij}} \Delta V'_{g_j} + \sum_{k=1}^{Ns} C_{gs_{ik}} \Delta V'_{s_k} - Q_g^{aver}}{Q_g^{sum}}, \quad (6)$$

where $\mu_{si}$ is the $i^{th}$ component in $\mu_s$, $\mu_{gi}$ is the $i^{th}$ component in $\mu_g$, $N_s$ is a number of the dynamic reactive power compensation devices participating in the optimization control, $N_g$ is a number of the generators participating in the optimization control, $Q_{s_i}$ is a $i^{th}$ component in $Q_s$, $C_{s_{ij}}$ is an element corresponding to a $j^{th}$ generator participating in the optimization control of a $i^{th}$ component in $C_s$, $\Delta V_{s_j}'$ is a $j^{th}$ component corresponding to the $j^{th}$ generator participating in the optimization control in $\Delta V_s'$, $C_{sg_{ik}}$ is an element corresponding to a $k^{th}$ dynamic reactive power compensation device participating in the optimization control of a $i^{th}$ component in $C_{sg}$, $\Delta V_{g_k}'$ is a $k^{th}$ component corresponding to the $k^{th}$ dynamic reactive power compensation device participating in the optimization control in $\Delta V_g'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ a $i^{th}$ component in $Q_s^{max}$, $Q_{g_i}$ is a $i^{th}$ component in $Q_g$, $C_{g_{ij}}$ is an element corresponding to the $j^{th}$ generator participating in the optimization control of a $i^{th}$ component in $C_g$, $\Delta V_{g_j}'$ is a $j^{th}$ component corresponding to the $j^{th}$ generator participating in the optimization control in $\Delta V_g'$, $C_{gs_{ik}}$ is an element corresponding to the $k^{th}$ dynamic reactive power compensation device participating in the optimization control of a $i^{th}$ component in $C_{gs}$, $\Delta V_{s_k}'$ is a $k^{th}$ component corresponding to the $k^{th}$ dynamic reactive power compensation device participating in the optimization control in $\Delta V_s'$, $Q_g^{aver}$ is an average value of reactive power of the generator participating in the optimization control, $Q_g^{sum}$ is a sum of reactive power of the generator participating in the optimization control.

At step S107: if the current reactive power of each dynamic reactive power compensation device is not between the first predetermined reactive power and the second predetermined reactive power, steps S101-S107 are repeated after the predetermined period of time.

The present disclosure also provides a voltage control apparatus of a central bus in a power system.

Figure 2:
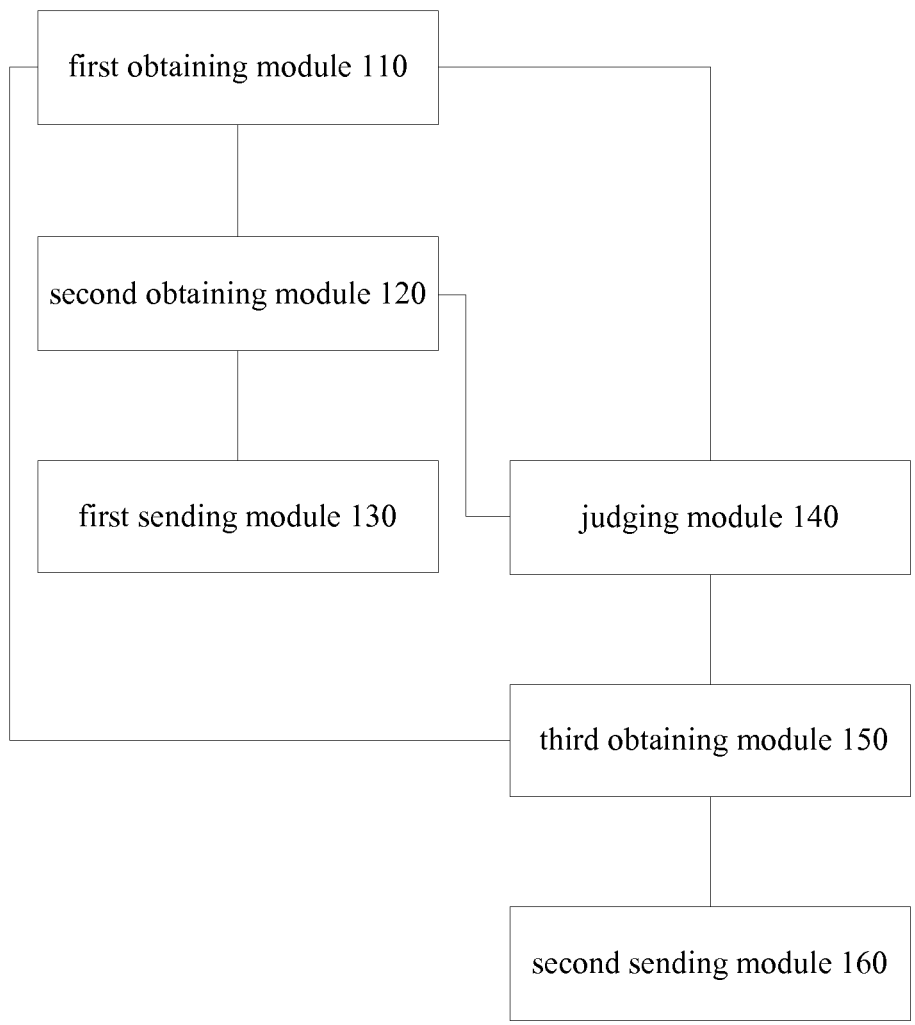
FIG. 2 is block diagram of the voltage control apparatus of a central bus in a power system according to an embodiment of the present disclosure.

FIG. 2 is block diagram of the voltage control apparatus of a central bus in a power system according to an embodiment of the present disclosure.

As shown in FIG. 2, the apparatus includes a first obtaining module 110, a second obtaining module 120, a first sending module 130, a judging module 140, a third obtaining module 150 and a second sending module 160.

Specifically, the first obtaining module 110 is configured to obtain a predetermined voltage and a current voltage of the central bus. More specifically, the predetermined voltage and the current voltage of the central bus can be obtained from a dispatching center of the power system by the first obtaining module 110. In particular, at a current acquisition time, the predetermined voltage and the current voltage of the central bus corresponding to the current acquisition time can be obtained from the dispatching center of the power system by the first obtaining module 110.

The second obtaining module 120 is configured to obtain a first voltage adjustment of a generator participating in a voltage control and a second voltage adjustment of a dynamic reactive power compensation device participating in the voltage control according to the predetermined voltage and the current voltage.

In an embodiment, the second obtaining module 120 is further configured to obtain the first voltage adjustment and the second voltage adjustment according to formula (1):

$$\min_{\Delta V_g, \Delta V_s} \left\{ W_p \| \alpha \cdot (V_p - V_p^{ref}) + C_{pg} \Delta V_g + C_{ps} \Delta V_s \|^2 + \right. \tag{1}$$
$$\left. W_q (\|\Theta_g\|^2 + \|\Theta_s\|^2) \right\}$$
$$\text{s.t.} \quad V_p^{min} \leq V_p + C_{pg} \Delta V_g + C_{ps} \Delta V_s \leq V_p^{max}$$
$$Q_g^{min} \leq Q_g + C_g \Delta V_g + C_{gs} \Delta V_s \leq Q_g^{max}$$
$$Q_s^{min} \leq Q_s + C_{sg} \Delta V_g + C_s \Delta V_s \leq Q_s^{max}$$
$$|\Delta V_g| \leq \Delta V_g^{max}$$
$$|\Delta V_s| \leq \Delta V_s^{max},$$

where p represents the central bus, g represents the generator, s represents the dynamic reactive power compensation device, $\Delta V_g$ is the first voltage adjustment vector, $\Delta V_s$ is the second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses and a range of $\alpha$ is 1-10, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses and a range of $W_p$ is 0.1-1, $W_q$ is a second weight coefficient vector of reserve margins of the reactive powers of the generators and the dynamic reactive power compensation devices and a range of $W_q$ is 10-100, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

In an embodiment, all parameters in formula (1) can be obtained from the dispatching center of the power system.

In an embodiment, a $i^{th}$ component in $\Theta_g$ may be calculated according to formula (2):

$$\Theta_{g_i} = \frac{Q_{g_i} + \sum_{j=1}^{N_g} C_{g_{ij}} \Delta V_{g_j} + \sum_{k=1}^{N_s} C_{gs_{ik}} \Delta V_{s_k} - Q_{g_i}^{min}}{Q_{g_i}^{max} - Q_{g_i}^{min}}, \tag{2}$$

and a $i^{th}$ component in $\Theta_s$ may be calculated according to formula (3):

$$\Theta_{s_i} = \frac{Q_{s_i} + \sum_{j=1}^{N_s} C_{s_{ij}} \Delta V_{s_j} + \sum_{k=1}^{N_g} C_{sg_{ik}} \Delta V_{g_k} - Q_{s_i}^{min}}{Q_{s_i}^{max} - Q_{s_i}^{min}}, \tag{3}$$

where $\Theta_{g_i}$ is the $i^{th}$ component in $\Theta_g$, $\Theta_{s_i}$ is the $i^{th}$ component in $\Theta_s$, $N_s$ is a number of the dynamic reactive power compensation devices participating in the voltage control, $N_g$ is a number of the generators participating in the voltage control, $Q_{g_i}$ is a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_g^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

The first sending module 130 is configured to send the first voltage adjustment to the generator participating in the voltage control and the second voltage adjustment to the dynamic reactive power compensation device participating in the voltage control to perform a voltage control.

More specifically, the first voltage adjustment and the second voltage adjustment can be as control instructions and sent to the corresponding generator and the dynamic reactive power compensation device by the first sending module 130, each generator and each dynamic reactive power compensation device perform the voltage control according to the corresponding control instruction at a voltage control phase of the central bus.

The judging module 140 is configured to judge whether a current reactive power of the dynamic reactive power compensation device is between a first predetermined reactive power and a second predetermined reactive power.

In an embodiment, the first predetermined reactive power is $Q_s^{pre}-0.1*Q_s^{max}$, the second predetermined reactive power is $Q_s^{pre}+0.1*Q_s^{max}$, where $Q_s^{pre}=(Q_s^{max}+Q_s^{min})/2$.

The third obtaining module 150 is configured to obtain a third voltage adjustment of a generator participating in an optimization control and a fourth voltage adjustment of a dynamic reactive power compensation device participating in the optimization control if the current reactive power of the dynamic reactive power compensation device is between the first predetermined reactive power and the second predetermined reactive power.

In an embodiment, the third obtaining module 150 is further configured to obtain the third voltage adjustment and the fourth voltage adjustment according to formula (4):

$$\min_{\Delta V_g', \Delta V_s'} \{W_s\|\mu_s\|^2 + W_g\|\mu_g\|^2\} \quad (4)$$

$$\text{s.t.} \quad V_p - V_{band} \le V_p + C_{pg}\Delta V_g' + C_{ps}\Delta V_s' \le V_p + V_{band}$$

$$Q_g^{min} \le Q_g + C_g\Delta V_g' + C_{gs}\Delta V_s' \le Q_g^{max}$$

$$Q_s^{min} \le Q_s + C_{sg}\Delta V_g' + C_s\Delta V_s' \le Q_s^{max}$$

$$|\Delta V_g'| \le \Delta V_g^{max}$$

$$|\Delta V_s'| \le \Delta V_s^{max},$$

where $\Delta V_g'$ is the third voltage adjustment vector, $\Delta V_s'$ is the fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control and a range of $W_s$ is 0.1-1, $W_g$ is a weight coefficient vector of the reactive powers of the generators participating in the optimization control and a range of $W_g$ is 10-100, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{min}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g^{max}$ is a maximum adjustment vector allowed by the generators participating in the optimization control, $\Delta V_s^{max}$ is a maximum adjustment vector allowed by the dynamic reactive power compensation devices participating in the optimization control.

In an embodiment, a $i^{th}$ component in $\mu_s$ is calculated according to formula (5):

$$\mu_{si} = \frac{Q_{si} + \sum_{j=1}^{Ns} C_{s_{ij}}\Delta V_{s_j}' + \sum_{k=1}^{Ng} C_{sg_{ik}}\Delta V_{g_k}' - Q_{s_i}^{reference}}{Q_{si}^{max} - Q_{si}^{min}}, \quad (5)$$

and a $i^{th}$ component in $\mu_g$ is calculated according to formula (6):

$$\mu_{gi} = \frac{Q_{gi} + \sum_{j=1}^{Ng} C_{g_{ij}}\Delta V_{g_j}' + \sum_{k=1}^{Ns} C_{gs_{ik}}\Delta V_{s_k}' - Q_g^{aver}}{Q_g^{sum}}, \quad (6)$$

where $\mu_{si}$ is the component in $\mu_s$, $\mu_{gi}$ is the $i^{th}$ component in $\mu_g$, $N_S$ is a number of the dynamic reactive power compensation devices participating in the optimization control, $N_g$ is a number of the generators participating in the optimization control, $Q_{s_i}$ is a $i^{th}$ component in $Q_s$, $C_{s_{ij}}$ is an element corresponding to a $j^{th}$ generator participating in the optimization control of a $i^{th}$ component in $C_s$, $\Delta V_{s_j}'$ is a $j^{th}$ component corresponding to the $j^{th}$ generator participating in the optimization control in $\Delta V_s'$, $C_{sg_{ik}}$ is an element corresponding to a $k^{th}$ dynamic reactive power compensation device participating in the optimization control of a $i^{th}$ component in $C_{sg}$, $\Delta V_{g_k}'$ is a $k^{th}$ component corresponding to the $k^{th}$ dynamic reactive power compensation device participating in the optimization control in $\Delta V_g'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ is a $i^{th}$ component in $Q_s^{max}$, $Q_{g_i}$ is a $i^{th}$ component in $Q_g$, $C_{g_{ij}}$ is an element corresponding to the $j^{th}$ generator participating in the optimization control of a $i^{th}$ component in $C_g$, $\Delta V_{g_j}'$ is a $j^{th}$ component corresponding to the $j^{th}$ generator participating in the optimization control in $\Delta V_g'$, $C_{gs_{ik}}$ is an element corresponding to the $k^{th}$ dynamic reactive power compensation device participating in the optimization control of a $i^{th}$ component in $C_{gs}$, $\Delta V_{s_k}{}'$ is a $k^{th}$ component corresponding to the $k^{th}$ dynamic reactive power compensation device participating in the optimization control in $\Delta V_s'$, $Q_g^{aver}$ is an average value of reactive power of the generator participating in the optimization control, $Q_g^{sum}$ is a sum of reactive power of the generator participating in the optimization control.

The second sending module 160 is configured to send the third voltage adjustment to the generator participating in the optimization control and the fourth voltage adjustment to the dynamic reactive power compensation device participating in the optimization control to perform a dynamic reactive power optimization.

With the voltage control method and apparatus of a central bus in a power system provided by the present disclosure, a dynamic reactive power compensation device is used in a conventional voltage control model and a characteristic of fast adjustment of the dynamic reactive power compensation device is fully utilized, in addition, a dynamic reactive power optimization model is established and a reserve level of a reactive power in the power system may be improved by replacing the reactive power of the dynamic reactive power compensation device with the slow dynamic reactive power compensation device, further, an effective preventive control for transient voltage stability may be implemented by the method and a recovery effect after disturbances of voltages of the power system can be improved.

A computer readable storage medium is provided, including a computer program for executing voltage control method and of a central bus in a power system according to the above embodiments of the present disclosure, when running on a computer.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A voltage control method of a central bus in a power system, comprising:
    S1: obtaining a predetermined voltage and a current voltage of the central bus;
    S2: obtaining a first voltage adjustment of a generator participating in a voltage control and a second voltage adjustment of a dynamic reactive power compensation device participating in the voltage control according to the predetermined voltage and the current voltage;
    S3: sending the first voltage adjustment to the generator participating in the voltage control and the second voltage adjustment to the dynamic reactive power compensation device participating in the voltage control to perform a voltage control;
    S4: judging whether a current reactive power of the dynamic reactive power compensation device is between a first predetermined reactive power and a second predetermined reactive power;
    S5: if the current reactive power of the dynamic reactive power compensation device is between the first predetermined reactive power and the second predetermined reactive power, obtaining a third voltage adjustment of a generator participating in an optimization control and a fourth voltage adjustment of a dynamic reactive power compensation device participating in the optimization control;
    S6: sending the third voltage adjustment to the generator participating in the optimization control and the fourth voltage adjustment to the dynamic reactive power compensation device participating in the optimization control to perform a dynamic reactive power optimization, and repeating steps S1-S7 after a predetermined period of time;
    S7: if the current reactive power of the dynamic reactive power compensation device is not between the first predetermined reactive power and the second predetermined reactive power, repeating steps S1-S7 after the predetermined period of time.

2. The method according to claim 1, wherein obtaining the first voltage adjustment and the second voltage adjustment according to formula (1):

$$\min_{\Delta V_g, \Delta V_s} \{W_p \|a \cdot (V_p - V_p^{ref}) + C_{pg}\Delta V_g + C_{ps}\Delta V_s\|^2 + W_q(\|\Theta_g\|^2 + \|\Theta_s\|^2)\} \quad (1)$$

$$\text{s.t.} \quad V_p^{min} \leq V_p + C_{pg}\Delta V_g + C_{ps}\Delta V_s \leq V_p^{max}$$

$$Q_g^{min} \leq Q_g + C_g\Delta V_g + C_{gs}\Delta V_s \leq Q_g^{max}$$

$$Q_s^{min} \leq Q_s + C_{sg}\Delta V_g + C_s\Delta V_s \leq Q_s^{max}$$

$$|\Delta V_g| \leq \Delta V_g^{max}$$

$$|\Delta V_s| \leq \Delta V_s^{max},$$

where p represents the central bus, g represents the generator, s represents the dynamic reactive power compensation device, $\Delta V_g$ is a first voltage adjustment vector, $\Delta V_s$ is a second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses, $W_q$ is a second weight coefficient vector of reserve margins of the reactive powers of the generators and the dynamic reactive power compensation devices, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

3. The method according to claim 2, wherein a $i^{th}$ component in $\Theta_g$ is calculated according to formula (2):

$$\Theta_{g_i} = \frac{Q_{g_i} + \sum_{j=1}^{Ng} C_{g_{ij}} \Delta V_{g_j} + \sum_{k=1}^{Ns} C_{gs_{ik}} \Delta V_{s_k} - Q_{g_i}^{min}}{Q_{g_i}^{max} - Q_{g_i}^{min}}, \quad (2)$$

and a $i^{th}$ component in $\Theta_s$ is calculated according to formula (3):

$$\Theta_{s_i} = \frac{Q_{s_i} + \sum_{j=1}^{Ns} C_{s_{ij}} \Delta V_{s_j} + \sum_{k=1}^{Ng} C_{sg_{ik}} \Delta V_{g_k} - Q_{s_i}^{min}}{Q_{s_i}^{max} - Q_{s_i}^{min}}, \quad (3)$$

where $\Theta_{g_i}$ is the $i^{th}$ component in $\Theta_g$, $\Theta_{s_i}$ is the $i^{th}$ component in $\Theta_s$, $N_S$ is a number of the dynamic reactive power compensation devices participating in the voltage control, $N_g$ is a number of the generators participating in the voltage control, $Q_{g_i}$ is a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $\Delta V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_{g_i}^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

4. The method according to claim 2, wherein the first predetermined reactive power is $Q_s^{pre} - 0.1 * Q_s^{max}$, the second predetermined reactive power is $Q_s^{pre} + 0.1 * Q_s^{max}$, where $Q_s^{pre} = (Q_s^{max} + Q_s^{min})/2$.

5. The method according to claim 1, wherein obtaining the third voltage adjustment and the fourth voltage adjustment according to formula (4):

$$\min_{\Delta V_g', \Delta V_s'} \{W_s \|\mu_s\|^2 + W_g \|\mu_g\|^2\} \quad (4)$$

$$\text{s.t.} \quad V_p - V_{band} \le V_p + C_{pg} \Delta V_g' + C_{ps} \Delta V_s' \le V_p + V_{band}$$

$$Q_g^{min} \le Q_g + C_g \Delta V_g' + C_{gs} \Delta V_s' \le Q_g^{max}$$

$$Q_s^{min} \le Q_s + C_{sg} \Delta V_g' + C_s \Delta V_s' \le Q_s^{max}$$

$$|\Delta V_g'| \le \Delta V_g^{max}$$

$$|\Delta V_s'| \le \Delta V_s^{max},$$

where $\Delta V_g'$ is a third voltage adjustment vector, $\Delta V_s'$ is a fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control, $W_g$ is a weight coefficient vector of the reactive powers of the generators participating in the optimization control, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{max}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g^{max}$ is a maximum adjustment vector allowed by the generators participating in the optimization control, $\Delta V_g^{max}$ is a maximum adjustment vector allowed by the dynamic reactive power compensation devices participating in the optimization control.

6. The method according to claim 5, wherein a $i^{th}$ component in $\mu_s$ is calculated according to formula (5):

$$\mu_{si} = \frac{Q_{si} + \sum_{j=1}^{Ns} C_{sij} \Delta V_{sj}' + \sum_{k=1}^{Ng} C_{sg_{ik}} \Delta V_{g_k}' - Q_{si}^{reference}}{Q_{si}^{max} - Q_{si}^{min}}, \quad (5)$$

and a $i^{th}$ component in $\mu_g$ is calculated according to formula (6):

$$\mu_{gi} = \frac{Q_{gi} + \sum_{j=1}^{Ng} C_{g_{ij}} \Delta V_{gj}' + \sum_{k=1}^{Ns} C_{gs_{ik}} \Delta V_{s_k}' - Q_g^{aver}}{Q_g^{sum}}, \quad (6)$$

where $\mu_{si}$ is the $i^{th}$ component in $\mu_s$, $\mu_{gi}$ is the $i^{th}$ component in $\mu_g$, $N_S$ is a number of the dynamic reactive power compensation devices participating in the optimization control, $N_g$ is a number of the generators participating in the optimization control, $Q_{s_i}$ is a $i^{th}$ component in $Q_s$, $C_{s_g}$ is an element corresponding to a $j^{th}$ generator participating in the optimization control of a $i^{th}$ component in $C_s$, $\Delta V_{s_j}'$ is a $j^{th}$ component corresponding to the $j^{th}$ generator participating in the optimization control in $\Delta V_s'$, $C_{sg_{ik}}$ is an element corresponding to a $k^{th}$ dynamic reactive power compensation device participating in the optimization control of a $i^{th}$ component in $C_{sg}$, $\Delta V_{g_k}'$ is a $k^{th}$ component corresponding to the $k^{th}$ dynamic reactive power compensation device participating in the optimization control in $\Delta V_g'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ is a $i^{th}$ component in $Q_s^{max}$, $Q_{g_i}$ is a $i^{th}$ component in $Q_g$, $C_{g_{ij}}$ is an element corresponding to the $j^{th}$ generator participating in the optimization control of a $i^{th}$ component in $C_g$, $\Delta V_{g_j}'$ is a $j^{th}$ component corresponding to the $i^{th}$ generator participating in the optimization control in $\Delta V_g'$, $C_{gs_{ik}}$ is an element corresponding to the $k^{th}$ dynamic reactive power compensation device participating in the optimization control of a $i^{th}$ component in $C_{gs}$, $\Delta V_{s_k}'$ is a $k^{th}$ component corresponding to the $k^{th}$ dynamic reactive power compensation device aver participating in the optimization control in $\Delta V_s'$, $Q_g^{aver}$ is an average value of reactive power of the generator participating in the optimization control, $Q_g^{sum}$ is a sum of reactive power of the generator participating in the optimization control.

7. A voltage control apparatus of a central bus in a power system, comprising:
a first obtaining module including a first processor, configured to obtain a predetermined voltage and a current voltage of the central bus;
a second obtaining module including a second processor, configured to obtain a first voltage adjustment of a generator participating in a voltage control and a second voltage adjustment of a dynamic reactive power compensation device participating in the voltage control according to the predetermined voltage and the current voltage;
a first sending module, configured to send the first voltage adjustment to the generator participating in the voltage control and the second voltage adjustment to the dynamic reactive power compensation device participating in the voltage control to perform a voltage control;
a judging module, configured to judge whether a current reactive power of the dynamic reactive power compensation device is between a first predetermined reactive power and a second predetermined reactive power;
a third obtaining module, configured to obtain a third voltage adjustment of a generator participating in an optimization control and a fourth voltage adjustment of a dynamic reactive power compensation device participating in the optimization control if the current reactive power of the dynamic reactive power compensation device is between the first predetermined reactive power and the second predetermined reactive power;
a second sending module, configured to send the third voltage adjustment to the generator participating in the optimization control and the fourth voltage adjustment to the dynamic reactive power compensation device participating in the optimization control to perform a dynamic reactive power optimization;
wherein the second obtaining module is further configured to obtain the first voltage adjustment and the second voltage adjustment according to formula (1):

$$\min_{\Delta V_g, \Delta V_s} \{W_p \| a \cdot (V_p - V_p^{ref}) + C_{pg} \Delta V_g + C_{ps} \Delta V_s \|^2 + \quad (1)$$
$$W_q (\|\Theta_g\|^2 + \|\Theta_s\|^2)\}$$
$$\text{s.t.} \quad V_p^{min} \leq V_p + C_{pg} \Delta V_g + C_{ps} \Delta V_s \leq V_p^{max}$$
$$Q_g^{min} \leq Q_g + C_g \Delta V_g + C_{gs} \Delta V_s \leq Q_g^{max}$$
$$Q_s^{min} \leq Q_s + C_{sg} \Delta V_g + C_s \Delta V_s \leq Q_s^{max}$$
$$|\Delta V_g| \leq \Delta V_g^{max}$$
$$|\Delta V_s| \leq \Delta V_s^{max},$$

where p represents the central bus, g represents the generator, s represents the dynamic reactive power compensation device, $\Delta V_g$ is a first voltage adjustment vector, $\Delta V_s$ is a second voltage adjustment vector, $V_p$ is a current voltage vector of central buses, $V_p^{ref}$ is a predetermined voltage vector of the central buses, $C_{pg}$ is a sensitivity matrix of voltage deviations of the central buses relative to $\Delta V_g$, $C_{ps}$ is a sensitivity matrix of the voltage deviations of the central buses relative to $\Delta V_s$, $\alpha$ is a gain coefficient vector of voltages of the central buses, $\Theta_g$ is a first margin vector of reactive powers of the generators participating in the voltage control, $\Theta_s$ is a second margin vector of reactive powers of the dynamic reactive power compensation devices participating in the voltage control, $W_p$ is a first weight coefficient vector of the voltage deviations of the central buses, $W_q$ is a second weight coefficient vector of reserve margins of the reactive powers of the generators and the dynamic reactive power compensation devices, $V_p^{min}$ is a predetermined lower limit vector of the voltages of the central buses, $V_p^{max}$ is a predetermined upper limit vector of the voltages of the central buses, $Q_g$ is a current reactive power vector of the generators participating in the voltage control, $Q_g^{min}$ is a lower limit vector of the reactive powers of the generators participating in the voltage control, $Q_g^{max}$ is an upper limit vector of the reactive powers of the generators participating in the voltage control, $C_g$ is a sensitivity matrix of a reactive power adjustment vector of the generators participating in the voltage control relative to $\Delta V_g$, $C_{gs}$ is a sensitivity matrix of the reactive power adjustment vector of the generators participating in the voltage control relative to $\Delta V_s$, $Q_s$ is a current reactive power vector of the dynamic reactive power compensation devices participating in the voltage control, $Q_s^{min}$ is a lower limit vector of the reactive powers of the dynamic reactive power compensation devices participating in the voltage control, $Q_s^{max}$ is an upper limit vector of the reactive powers of the dynamic reactive power compensation devices participating in the voltage control, $C_s$ is a sensitivity matrix of a reactive power adjustment vector of the dynamic reactive power compensation devices participating in the voltage control relative to $\Delta V_s$, $C_{sg}$ is a sensitivity matrix of the reactive power adjustment vector of the dynamic reactive power compensation devices participating in the voltage control relative to $\Delta V_g$, $\Delta V_g^{max}$ is a maximum adjustment vector allowed by the generators participating in the voltage control, $\Delta V_s^{max}$ is a maximum adjustment vector allowed by the dynamic reactive power compensation devices participating in the voltage control.

8. The apparatus according to claim 7, wherein a $i^{th}$ component in $\Theta_g$ is calculated according to formula (2):

$$\Theta_{g_i} = \frac{Q_{g_i} + \sum_{j=1}^{Ng} C_{g_{ij}} \Delta V_{g_j} + \sum_{k=1}^{Ns} C_{gs_{ik}} \Delta V_{s_k} - Q_{g_i}^{min}}{Q_{g_i}^{max} - Q_{g_i}^{min}}, \quad (2)$$

and a $i^{th}$ component in $\Theta_s$ is calculated according to formula (3):

$$\Theta_{s_i} = \frac{Q_{s_i} + \sum_{j=1}^{Ns} C_{s_{ij}} \Delta V_{s_j} + \sum_{k=1}^{Ng} C_{sg_{ik}} \Delta V_{g_k} - Q_{s_i}^{min}}{Q_{s_i}^{max} - Q_{s_i}^{min}}, \quad (3)$$

where $\Theta_{g_i}$ is the $i^{th}$ component in $\Theta_g$, $\Theta_{s_i}$ is the $i^{th}$ component in $\Theta_s$, $N_S$ is a number of the dynamic reactive power compensation devices participating in the voltage control, $N_g$ is a number of the generators participating in the voltage control, $Q_{g_i}$ is a $i^{th}$ component in $Q_g$, $C_{g_{ij}}$ is an element corresponding to a $j^{th}$ generator participating in the voltage control of a $i^{th}$ component in $C_g$, $\Delta V_{g_j}$ is a $j^{th}$ component corresponding to the $j^{th}$ generator participating in the voltage control in $\Delta V_g$, $C_{gs_{ik}}$ is an element corresponding to a $k^{th}$ dynamic reactive power compensation device participating in the voltage control of a $i^{th}$ component in $C_{gs}$, $\Delta V_{s_k}$ is a $k^{th}$ component corresponding to the $k^{th}$ dynamic reactive power compensation device participating in the voltage control in $\Delta V_s$, $Q_{g_i}^{min}$ is a $i^{th}$ component in $Q_g^{min}$, $Q_{g_i}^{max}$ is a $i^{th}$ component in $Q_g^{max}$, $Q_{s_i}$ is a $i^{th}$ component in $Q_s$, $C_{s_{ij}}$ is an element corresponding to the $j^{th}$ generator participating in the voltage control of a $i^{th}$ component in $C_s$, $\Delta V_{s_j}$ is a $j^{th}$ component corresponding to the $j^{th}$ generator participating in the voltage control in $\Delta V_s$, $C_{sg_{ik}}$ is an element corresponding to the $k^{th}$ dynamic reactive power compensation device participating in the voltage control of a $i^{th}$ component in $C_{sg}$, $\Delta V_{g_k}$ is a $k^{th}$ component corresponding to the $k^{th}$ dynamic reactive power compensation device participating in the voltage control in $\Delta V_g$, $Q_{s_i}^{min}$ is a $i^{th}$ component in $Q_s^{min}$, $Q_{s_i}^{max}$ is a $i^{th}$ component in $Q_s^{max}$.

9. The apparatus according to claim 7, wherein the first predetermined reactive power is $Q_s^{pre} - 0.1 * Q_s^{max}$, the second predetermined reactive power is $Q_s^{pre} + 0.1 * Q_s^{max}$, where $Q_s^{pre} = (Q_s^{max} + Q_s^{min})/2$.

10. The apparatus according to claim 7, wherein the third obtaining module is further configured to obtain the third voltage adjustment and the fourth voltage adjustment according to formula (4):

$$\min_{\Delta V_g', \Delta V_s'} \{W_s \|\mu_s\|^2 + W_g \|\mu_g\|^2\} \quad (4)$$

s.t. $\quad V_p - V_{band} \leq V_p + C_{pg} \Delta V_g' + C_{ps} \Delta V_s' \leq V_p + V_{band}$ $Q_g^{min} \leq Q_g + C_g \Delta V_g' + C_{gs} \Delta V_s' \leq Q_g^{max}$ $Q_s^{min} \leq Q_s + C_{sg} \Delta V_g' + C_s \Delta V_s' \leq Q_s^{max}$ $|\Delta V_g'| \leq \Delta V_g^{max}$ $|\Delta V_s'| \leq \Delta V_s^{max}$, where $\Delta V_g'$ is a third voltage adjustment vector, $\Delta V_s'$ is a fourth voltage adjustment vector, $\mu_s$ is a reactive power vector of the dynamic reactive power compensation devices participating in the optimization control, $\mu_g$ is a reactive power vector of the generators participating in the optimization control, $W_s$ is a weight coefficient vector of the reactive powers of the dynamic reactive power compensation devices participating in the optimization control, $W_g$ is a weight coefficient vector of the reactive powers of the generators participating in the optimization control, $V_p$ is a current voltage vector of central buses, $V_{band}$ is a voltage deadband value for controlling, $C_{pg}$ is a sensitivity matrix of the voltage deviations of the central buses relative to $\Delta V_g'$, $C_{ps}$ is a sensitivity matrix of the voltage deviations of the central buses relative to $\Delta V_s'$, $Q_g$ is a current reactive power vector of the generators participating in the optimization control, $Q_g^{min}$ is a lower limit vector of reactive powers of the generators participating in the optimization control, $Q_g^{max}$ is an upper limit vector of the reactive powers of the generators participating in the optimization control, $C_g$ is a sensitivity matrix of a reactive power adjustment vector of the generators participating in the optimization control relative to $\Delta V_g'$, $Q_s$ is a current reactive power vector of the dynamic reactive power compensation devices participating in the optimization control, $Q_s^{min}$ is a lower limit vector of reactive powers of the dynamic reactive power compensation devices participating in the optimization control, $Q_s^{max}$ is an upper limit vector of the reactive powers of the dynamic reactive power compensation devices participating in the optimization control, $C_s$ is a sensitivity matrix of a reactive power adjustment vector of the dynamic reactive power compensation devices participating in the optimization control relative to $\Delta V_s'$, $C_{gs}$ is a sensitivity matrix of the reactive power adjustment vector of the generators participating in the optimization control relative to $\Delta V_s'$, $C_{sg}$ is a sensitivity matrix of the reactive power adjustment vector of the dynamic reactive power compensation devices participating in the optimization control relative to $\Delta V_g'$, $\Delta V_g^{max}$ is a maximum adjustment vector allowed by the generators participating in the optimization control, $\Delta V_s^{max}$ is a maximum adjustment vector allowed by the dynamic reactive power compensation devices participating in the optimization control.

11. The apparatus according to claim 10, wherein a $i^{th}$ component in $\mu_s$ is calculated according to formula (5):

$$\mu_{si} = \frac{Q_{si} + \sum_{j=1}^{N_s} C_{s_{ij}} \Delta V_{s_j}' + \sum_{k=1}^{N_g} C_{sg_{ik}} \Delta V_{g_k}' - Q_{s_i}^{reference}}{Q_{si}^{max} - Q_{si}^{min}}, \quad (5)$$

and a $i^{th}$ component in $\mu_g$ is calculated according to formula (6):

$$\mu_{gi} = \frac{Q_{gi} + \sum_{j=1}^{N_g} C_{g_{ij}} \Delta V_{g_j}' + \sum_{k=1}^{N_s} C_{gs_{ik}} \Delta V_{s_k}' - Q_g^{aver}}{Q_g^{sum}}, \quad (6)$$

where $\mu_{si}$ is the $i^{th}$ component in $\mu_s$, $\mu_{gi}$ is the $i^{th}$ component in $\mu_g$, $N_S$ is a number of the dynamic reactive power compensation devices participating in the optimization control, $N_g$ is a number of the generators participating in the optimization control, $Q_{s_i}$ is a $i^{th}$ component in $Q_s$, $C_{s_{ij}}$ is an element corresponding to a $j^{th}$ generator participating in the optimization control of a $i^{th}$ component in $C_s$, $\Delta V_{s_j}'$ is a $j^{th}$ component corresponding to the $j^{th}$ generator participating in the optimization control in $\Delta V_s'$, $C_{sg_{ik}}$ is an element corresponding to a $k^{th}$ dynamic reactive power compensation device participating in the optimization control of a $i^{th}$ component in $C_{sg}$, $\Delta V_{g_k}'$ is a $k^{th}$ component corresponding to the $k^{th}$ dynamic reactive power compensation device participating in the optimization control in $\Delta V_g'$, $Q_{s_i}^{reference}$ is a predetermined margin of the dynamic reactive power compensation device participating in the optimization control, $Q_{s_i}^{min}$ is a $i^{th}$ component in $Q_s^{min}$, $Q_{s_i}^{max}$ is a $i^{th}$ component in $Q_s^{max}$, $Q_{g_i}$ is a $i^{th}$ component in $Q_g$, $C_{g_{ij}}$ is an element corresponding to the $i^{th}$ generator participating in the optimization control of a $i^{th}$ component in $C_g$, $\Delta V_{g_j}'$ is a $j^{th}$ component corresponding to the $j^{th}$ generator participating in the optimization control in $\Delta V_g'$, $C_{gs_{ik}}$ is an element corresponding to the $k^{th}$ dynamic reactive power compensation device participating in the optimization control of a $i^{th}$ component in $C_{gs}$, $\Delta V_{s_k}'$ is a $k^{th}$ component corresponding to the $k^{th}$ dynamic reactive power compensation device participating in the optimization control in $\Delta V_s'$, $Q_g^{aver}$ is an average value of reactive power of the generator participating in the optimization control, $Q_g^{sum}$ is a sum of reactive power of the generator participating in the optimization control.

12. A non-transitory computer readable storage medium, comprising a computer program for executing steps of:

S1: obtaining a predetermined voltage and a current voltage of the central bus;

S2: obtaining a first voltage adjustment of a generator participating in a voltage control and a second voltage adjustment of a dynamic reactive power compensation device participating in the voltage control according to the predetermined voltage and the current voltage;

S3: sending the first voltage adjustment to the generator participating in the voltage control and the second voltage adjustment to the dynamic reactive power compensation device participating in the voltage control to perform a voltage control;

S4: judging whether a current reactive power of the dynamic reactive power compensation device is between a first predetermined reactive power and a second predetermined reactive power;

S5: if the current reactive power of the dynamic reactive power compensation device is between the first predetermined reactive power and the second predetermined reactive power, obtaining a third voltage adjustment of a generator participating in an optimization control and a fourth voltage adjustment of a dynamic reactive power compensation devices participating in the optimization control;

S6: sending the third voltage adjustment to the generator participating in the optimization control and the fourth voltage adjustment to the dynamic reactive power compensation device participating in the optimization control to perform a dynamic reactive power optimization, and repeating steps S1-S7 after a predetermined period of time;

S7: if the current reactive power of the dynamic reactive power compensation device is not between the first predetermined reactive power and the second predetermined reactive power, repeating steps S1-S7 after the predetermined period of time.

* * * * *